(12) United States Patent
Calvignac et al.

(10) Patent No.: US 7,742,480 B2
(45) Date of Patent: Jun. 22, 2010

(54) SELECTIVE HEADER FIELD DISPATCH IN A NETWORK PROCESSING SYSTEM

(75) Inventors: Jean Louis Calvignac, Cary, NC (US); Gordon Taylor Davis, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 343 days.

(21) Appl. No.: 11/776,807

(22) Filed: Jul. 12, 2007

(65) Prior Publication Data

US 2008/0013541 A1 Jan. 17, 2008

Related U.S. Application Data

(62) Division of application No. 10/170,515, filed on Jun. 13, 2002, now Pat. No. 7,408,957.

(51) Int. Cl.
*H04L 12/56* (2006.01)
(52) U.S. Cl. .................... 370/392; 370/395.1; 370/476; 370/397; 370/389
(58) Field of Classification Search ................. 370/392, 370/323, 316, 415, 412, 401, 352, 537, 389, 370/466, 490; 709/232, 247; 714/774, 758, 714/776
See application file for complete search history.

(56) References Cited

U.S. PATENT DOCUMENTS

| | | | |
|---|---|---|---|
| 6,795,436 B1 * | 9/2004 | De Vriendt et al. | 370/395.1 |
| 6,990,106 B2 | 1/2006 | Bhatia | |
| 7,020,149 B1 | 3/2006 | Hellwig et al. | |
| 7,031,330 B1 | 4/2006 | Bianchini, Jr. | |
| 7,170,893 B2 | 1/2007 | Rajan et al. | |
| 2002/0122411 A1 | 9/2002 | Zimmerman et al. | |
| 2003/0041163 A1 * | 2/2003 | Rhoades et al. | 709/232 |
| 2007/0019674 A1 * | 1/2007 | Bourlas et al. | 370/466 |

* cited by examiner

*Primary Examiner*—Pankaj Kumar
*Assistant Examiner*—Yosief Berhane
(74) *Attorney, Agent, or Firm*—Patrick J. Daugherty; Driggs, Hogg, Daugherty & Del Zoppo Co., LPA

(57) ABSTRACT

A method and structure are disclosed for dispatching appropriate data to a network processing system comprising an improved technique for extracting protocol header fields for use by the network processor. This technique includes basic classification of a packet according to the types of protocol headers present in the packet. Based on the results of the classification, specific parameter fields are extracted from corresponding headers. All such parameter fields from one or more protocol headers in the packet are concatenated into a compressed dispatch message. Multiples of such dispatch messages are bundled into a single composite dispatch message. Thus, selected header fields from N packets are passed to the network processor in a single composite dispatch message, increasing the network processor's packet forwarding capacity by a factor of N. Likewise, multiple enqueue messages are bundled into a single composite enqueue message to direct enqueue and frame alterations to be taken on the bundle of N packets.

20 Claims, 15 Drawing Sheets

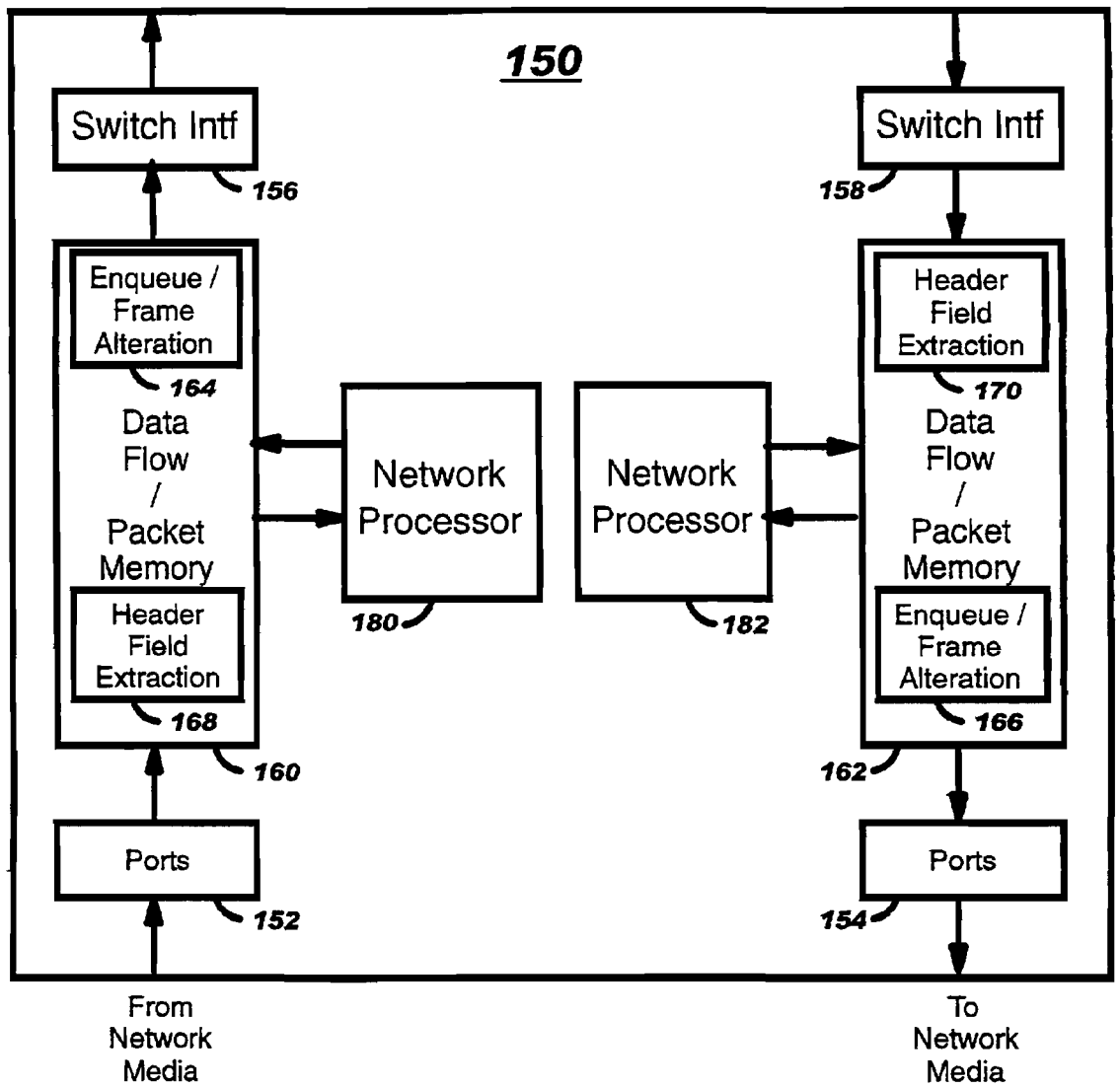
FIG. 4-A

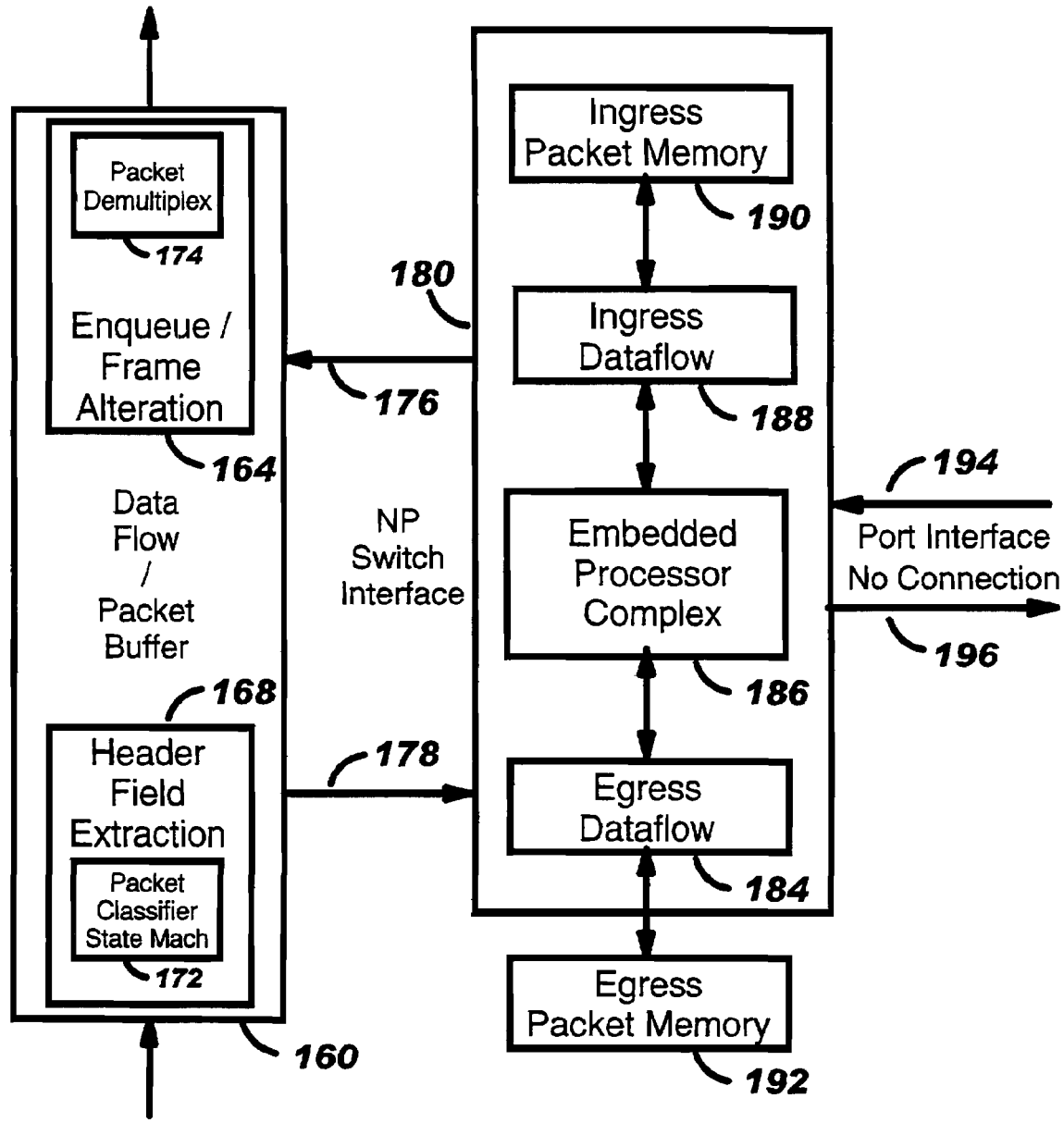
FIG. 4-B

| Cell Header 302 | | | | 304 |
|---|---|---|---|---|
| Composite Frame Header | | | | |
| VLAN Tag | Ethernet MAC Destination Address | | | |
| Ethernet MAC Source Address | | | Port # | Version |
| TOS | Protocol | Length | IP Source Address | |
| IP Destination Address | | TCP Source Port | TCP Dest Port | |
| Selected Header Parameters for Packet 2 | | | | |

↘ 340

| Cell Header 302 | |
|---|---|
| Selected Header Parameters for Packet 2 | |
| Selected Header Parameters for Packet 3 | |
| | |

↘ 360

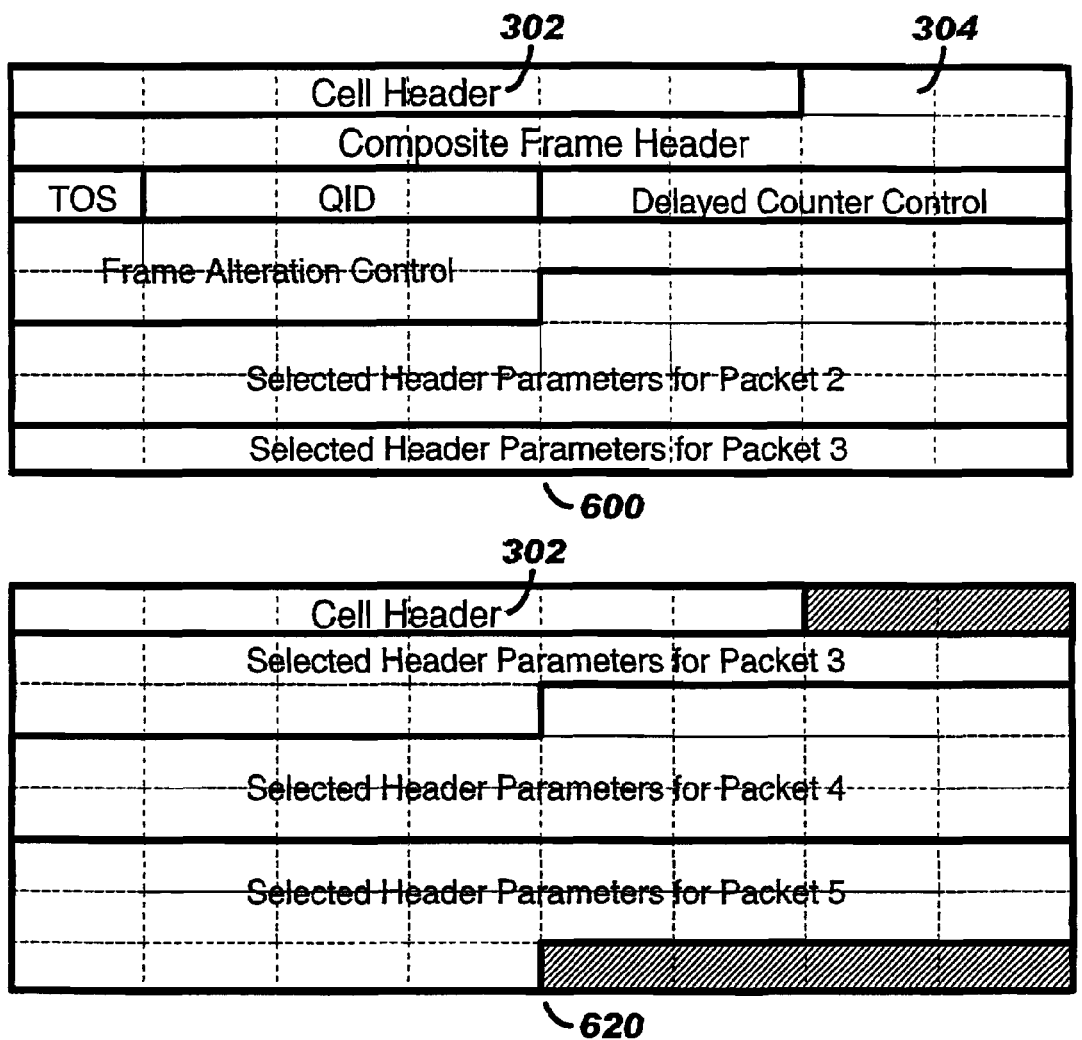
FIG. 11-A

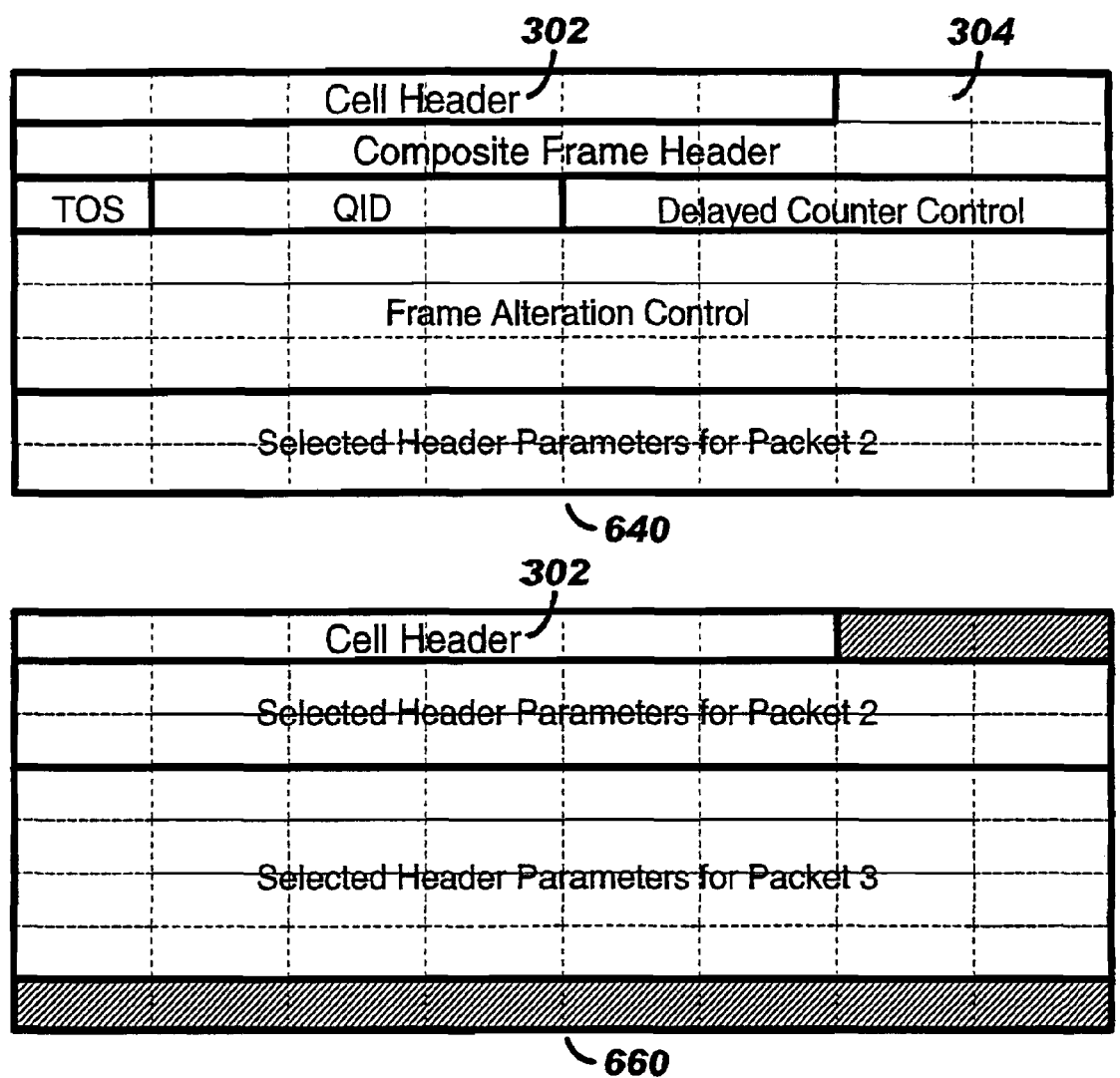
FIG. 11-B

US 7,742,480 B2

SELECTIVE HEADER FIELD DISPATCH IN A NETWORK PROCESSING SYSTEM

CROSS REFERENCE TO RELATED APPLICATION

This application is a division of application Ser. No. 10/170,515, filed Jun. 13, 2002, entitled SELECTIVE HEADER FIELD DISPATCH IN A NETWORK PROCESSING SYSTEM.

FIELD OF THE INVENTION

The present invention relates to network processing systems, and more specifically to the dispatching of packet data to a network processor to facilitate the network processor's task of routing, modifying, or otherwise handling associated packets.

BACKGROUND OF THE INVENTION

In typical networks, such as those depicted in FIG. 1, switches and routers are used to guide network traffic consisting of packetized data from one node to the next in order to guide each of those packets from its source to its destination. Networking nodes such as switches and routers have previously been implemented using custom logic designs to process these packets. More recently, programmable devices referred to as network processors have been deployed in networking nodes in order to achieve more flexibility and more complex functionality.

Packets traversing a network consist of a data payload that has been encapsulated within one or more protocol layers, each with an associated protocol header. These headers include information regarding both the origination and destination of a packet, as well as some indications of actions taken by the network in transporting the packet. These headers contain the data required by the network processor or other switching/routing devices in order to properly handle a packet at a particular network node. Several different network processor architectures have been implemented, with differing approaches in terms of dispatching header contents from individual packets to guide the processing of those packets. Some architectures allow the entire packet to flow through the network processor, enabling the processor to extract header fields of interest. Other network processors work jointly with a data flow device that stores the packet data in a packet memory and dispatches only packet headers to the network processors. There are two variants of these data flow devices. A first type stores the entire packet, and then retrieves a packet header from the packet memory when the time is appropriate for the network processor to handle the packet. A second type of data flow device splits the packet into a header piece and a body piece, and stores the body piece immediately in the packet memory, while sending the header piece directly to the network processor without storing it in the packet memory. The header piece, after being processed by the network processor, is returned to the dataflow device where it is joined to the original packet body.

FIG. 1 is a depiction of several networks in the prior art. Specifically, network 2 is representative of a campus network consisting of a plurality of network nodes 10, 20 providing switching and routing functions in order to interconnect client hosts 12, 14, 16, 22, 24, 26 and server hosts 17, 18, 27. Network nodes 10, 20 are also interconnected with each other in order to facilitate interconnection of hosts attached to different nodes. Network node 10 also includes a gateway function 19 that provides a connection to the Internet 40. Gateway function 19 may also include advanced network functions such as firewall and other security features. Thus, any host in network 2 is capable of accessing the Internet 40 and other devices and networks attached to the Internet 40. Network 4 is representative of a small office network with a single network node 30 interconnecting a small number of client hosts 34, 36 and server hosts 38. Network node 30 also includes a gateway function 32 that provides a connection to the Internet 40. Internet 40 consists of a plurality of network nodes 42, 44, 46 providing routing functions within Internet 40. Network 5 is representative of an array of web servers 52, 54, 56 attached to the Internet 40 through a load balancer 50. As will be understood by those skilled in the art, FIG. 1 is for illustrative purposes only and represents significant simplification of real networks. As such, network functions depicted should not be interpreted as a limitation in any way as to the variety of networking functions and environments for which the present invention can be practiced.

FIG. 2 is a depiction of a typical switch/router 10 in the prior art that might be used at each network node 10, 20, 30, 42, 44, 46. Switch/router 10 consists of a switch fabric 60 interconnecting multiple router blades 80, 90, 100. Each router blade is also connected to one or more network interfaces, each of which may connect to another network, another network node within the same network, a server host, a client host, or other network-attached devices. Specific router blades may support gateway, firewall, load balancer, and other network functions, in addition to standard packet forwarding, depending on configuration and position within the network.

FIG. 3 is a more detailed depiction of a specific router blade 100 in the prior art that might be used within each switch/router network node 10, 20, 30, 42, 44, 46. Ports consisting of an input component 110, and an output component 112 provide connections to network links. A blade 100 may support a single high-speed port in each direction or a plurality of lower speed ports. An Ingress data flow device 130 receives packets from network links through input ports 110 and sends packets to the switch fabric 60 through switch interface 120. An Egress data flow device 132 receives packets from switch fabric 60 through switch interface 122 and sends packets to the network links through output ports 112. Ingress data flow device 130 stores packets in a packet memory or buffer, and sends packet headers to network processor 140 for appropriate handling of Ingress tasks. Egress data flow device 132 stores packets in a packet memory or buffer, and sends packet headers to network processor 142 for appropriate handling of Egress tasks. Optional implementations may replace the combination of network processors 140 and 142 with a single network processing complex capable of processing either Ingress or Egress tasks. It should be recognized that functional blocks illustrated in FIG. 3 may each be individual chips, or may be functions within a single larger chip, or any combination of the two.

FIG. 5 is a depiction of typical network packets in the prior art. In each case, the data payload 290 is encapsulated within one or more layers of protocol, each with an associated protocol header. Packet 202 depicts an Ethernet packet encapsulating a TCP/IP message. Packet 202 consists of an Ethernet header 200, IP header 240, TCP header 260, data payload 290, and Cyclic Redundancy Code (CRC) 295 for error protection. Packet 204 depicts an Ethernet packet encapsulating an UDP/IP message. Packet 204 consists of an Ethernet header 200, IP header 240, UDP header 280, data payload 290, and CRC 295 for error protection. Packet 222 depicts a Point-to-Point (PPP) packet, typically used in Packet-over- Sonet (POS) network connections, encapsulating a TCP/IP message. Packet 222 consists of a PPP header 220, IP header 240, TCP header 260, data payload 290, and CRC 295 for error protection. Packet 224 depicts a PPP packet encapsulating an UDP/IP message. Packet 224 consists of a PPP header 220, IP header 240, UDP header 280, data payload 290, and CRC 295 for error protection. Packet 226 depicts a PPP packet, with MPLS encapsulation of a TCP/IP message. Packet 226 consists of a PPP header 220, MPLS label 230, IP header 240, TCP header 260, data payload 290, and CRC 295 for error protection. Packet 228 depicts a PPP packet, with MPLS encapsulation of an UDP/IP message. Packet 228 consists of a PPP header 220, MPLS label 230, IP header 240, UDP header 280, data payload 290, and CRC 295 for error protection. The forgoing packet formats are common examples of typical packet formats, but it is understood that many other protocols and combinations of protocols coexist within various networks and could equally well provide a prior art foundation upon which to practice the present invention.

FIG. 6 is a depiction of typical packet header formats in the prior art for packet headers used in packet formats depicted in FIG. 5. Note that many of the fields defined in these protocol headers are not required by intermediate routing nodes but are included in a dispatch to a network processor in order to send a single contiguous block of header data during dispatch operations. Ethernet header 200 consists of the following fields:

| | |
|---|---|
| VLAN tag | 2 bytes |
| Ethernet MAC Destination Address | 6 bytes |
| Ethernet MAC Source Address | 6 bytes |
| Ethernet Type | 2 bytes |

The PPP header 220 consists of the following fields:

| | |
|---|---|
| Address | 1 byte |
| Control | 1 byte |
| Protocol | 2 bytes |

The MPLS header 230 consists of the following fields:

| | |
|---|---|
| MPLS label | 4 bytes |

The IP header 240 consists of the following fields:

| | |
|---|---|
| Version/Header length | 1 byte |
| TOS | 1 byte |
| Length | 2 bytes |
| ID | 2 bytes |
| Flag/Fragment offset | 2 bytes |
| TTL | 1 byte |
| Protocol | 1 byte |
| Checksum | 2 bytes |
| Source Address | 4 bytes |
| Destination Address | 4 bytes |
| Options/Padding | 4 bytes |

The TCP header 260 consists of the following fields:

| | |
|---|---|
| Source Port | 2 bytes |
| Destination Port | 2 bytes |
| Sequence Number | 4 bytes |
| Acknowledge Number | 4 bytes |
| Data Offset/Reserved | 1 byte |
| Control/Reserved | 1 byte |
| Window | 2 bytes |
| Checksum | 2 bytes |
| Urgent | 2 bytes |
| Options/Padding | variable |

The UDP header 280 consists of the following fields:

| | |
|---|---|
| Source Port | 2 bytes |
| Destination Port | 2 bytes |
| Length | 2 bytes |
| Checksum | 2 bytes |

As can be readily understood from the forgoing description of protocol headers required by a network processor to handle network packets, a substantial amount of data must be sent to the network processor during the dispatching of a packet-forwarding task, although some of the fields in these protocol headers are not required by intermediate routing nodes. Moreover, it should be understood that each packet dispatch includes additional overhead associated with the specific network processor architecture. In each of the network processor configurations previously mentioned, a significant amount of data must be exchanged with the network processor in order for the network processor to complete its required tasks with regards to guiding network packets through the network node. This becomes more challenging as network links become increasingly fast, with corresponding increases in packet rates. In the past, dispatching of packet tasks has been dealt with by dispatching a complete packet header to the network processor for each packet to be handled. But this is cumbersome and relatively slow, and network links continue to increase in their transport capacity. Hence, a faster and more efficient technique is needed to dispatch appropriate data to a network device.

SUMMARY OF THE INVENTION

The present invention provides a method and structure for dispatching appropriate data to a network processing system comprising an improved technique for extracting protocol header fields for use by the network processor. This technique includes basic classification of a packet according to the types of protocol headers present in the packet. Based on the results of the classification, specific parameter fields are extracted from the corresponding headers. All such parameter fields from one or more protocol headers in the packet are concatenated into a compressed dispatch message. Compression is achieved by the elimination of parameter fields that are not required for completing packet-processing tasks. Advantageously, this elimination of unnecessary parameter fields results in a significant reduction in the data throughput capacity required by the connection from a data flow device into the network processor.

Recognizing that each dispatch message to a network processor includes additional overhead specific to the network processing system, and that the capability of a network processor to handle dispatch messages is limited and typically independent of processor instruction execution rates, another object of the present invention includes combining the compressed dispatch messages from a plurality of packets into a single composite dispatch message. Thus selected header fields from N packets are passed to the network processor in a single dispatch message, increasing the network processor's packet forwarding capacity by a factor of N (up to the limit of the processor's instruction execution capacity).

In operation, packets of similar formats are preferably bundled in a composite dispatch message. Conversely, packets of significantly differing formats are preferably bundled in different messages. In many implementations separation between Ethernet and PPP (Packet over Sonet) is achieved naturally since these different physical link interfaces are likely on different blades. To facilitate processing by network processor connected to different media types, each type of packets is preferably queued up separately to insure all packets within a composite dispatch message share the same format. An optional time-out function could dispatch fewer than the typical number N of packets to avoid excessive latency for packet formats encountered less frequently. However, basic PPP packets and PPP/MPLS packets could likely be mixed on the same bundle. TCP and UDP packets might also be mixed on the same bundle. The same dispatch message size is appropriate for each, but with different fields of interest. Control packets associated with router maintenance functions are preferably dispatched without being combined with other packets.

Once a composite dispatch message has been accepted by the network processor, each compressed packet dispatch message is processed separately using standard packet forwarding code. Results from processing each packet associated with a composite dispatch message are accumulated in a common composite enqueue message to be returned to the data flow device once all packets associated with the message have been processed. Additional scaffolding code must be added to loop through the forwarding code once for each packet represented in the message. This scaffolding code must also adapt the formats of input and output messages to facilitate handling of multiple packets in a single composite dispatch message, and handle buffer management issues unique to the composite dispatch and enqueue messages.

Packet forwarding code could potentially be optimized for higher performance at the expense of code complexity by overlapping code execution for one packet with memory accesses and table searches for another packet. One might achieve a form of software multi-threading by using this procedure.

During the time the packet is being processed by the network processor, the data flow device must maintain an identifier for each packet. This identifier is used to form an association between the packet and its corresponding dispatch message. The data flow device receives each composite enqueue message from the network processor, and parses it into an individual enqueue message for each associated packet. Each packet enqueue message is then combined with its associated packet using the packet identifier. The enqueue message is then used to control the hardware enqueue operation (i.e. selection of the desired target blade queue on ingress, or the desired output scheduler flow or port queue on egress), and required frame alterations.

BRIEF DESCRIPTION OF THE DRAWINGS

The objects, features, and advantages of the present invention will become apparent to those skilled in the art, in view of the following detailed description taken in combination with the attached drawings, in which:

FIG. 4-A is a depiction of a typical router blade in accordance with the present invention.

FIG. 4-B is a more detailed depiction of the Ingress portion of a typical router blade in accordance with the present invention.

FIG. 8-B is a depiction of a dispatch message for Ethernet packets to an Ingress network processor in accordance with the present invention.

FIG. 11-A is a depiction of an enqueue message for PPP packets from an Egress network processor in accordance with the present invention.

FIG. 11-B is a depiction of an enqueue message for Ethernet packets from an Egress network processor in accordance with the present invention.

DESCRIPTION OF THE PREFERRED EMBODIMENT

Figure 1:
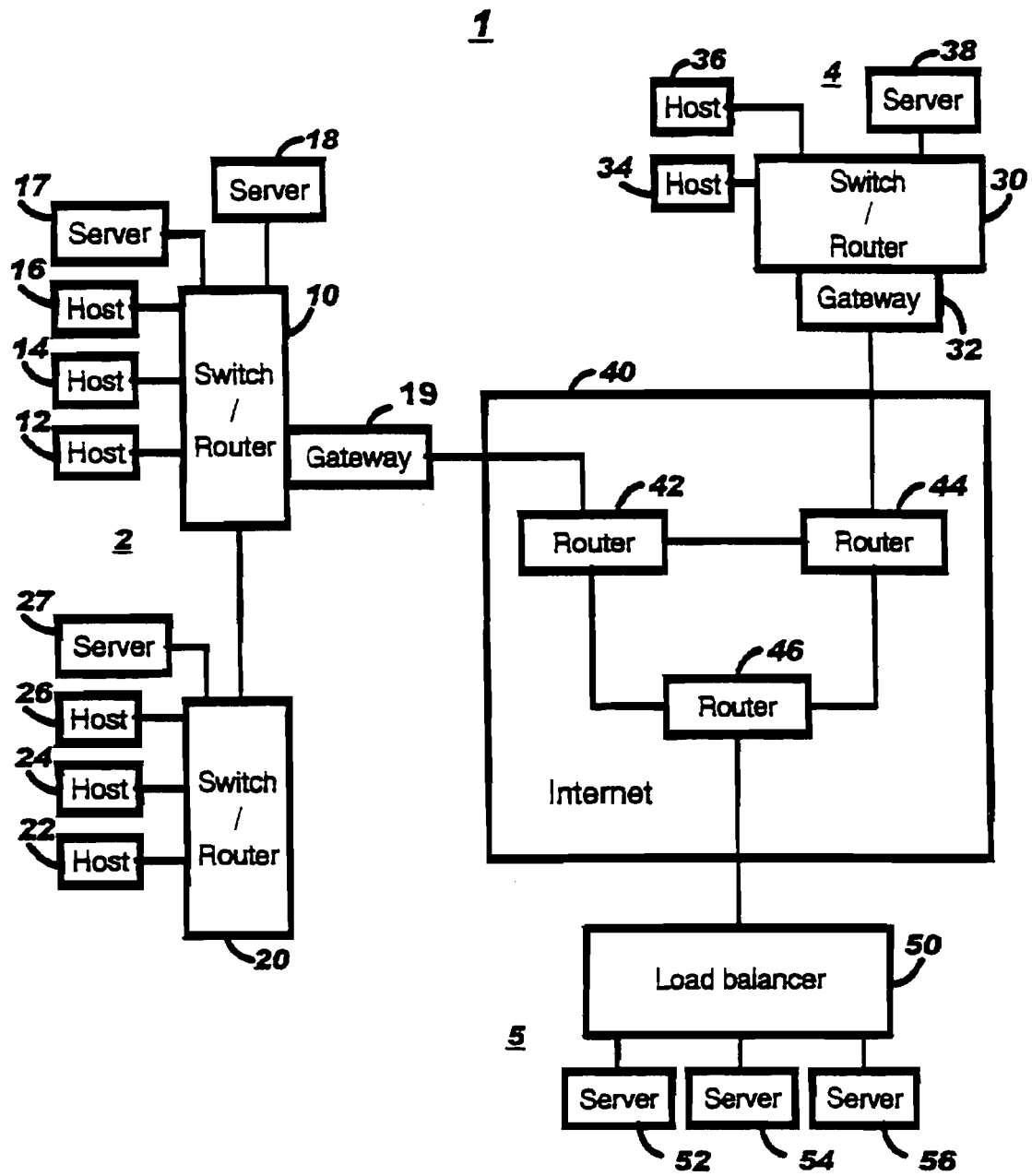
FIG. 1 is a depiction of several networks in the prior art.
Figure 2:
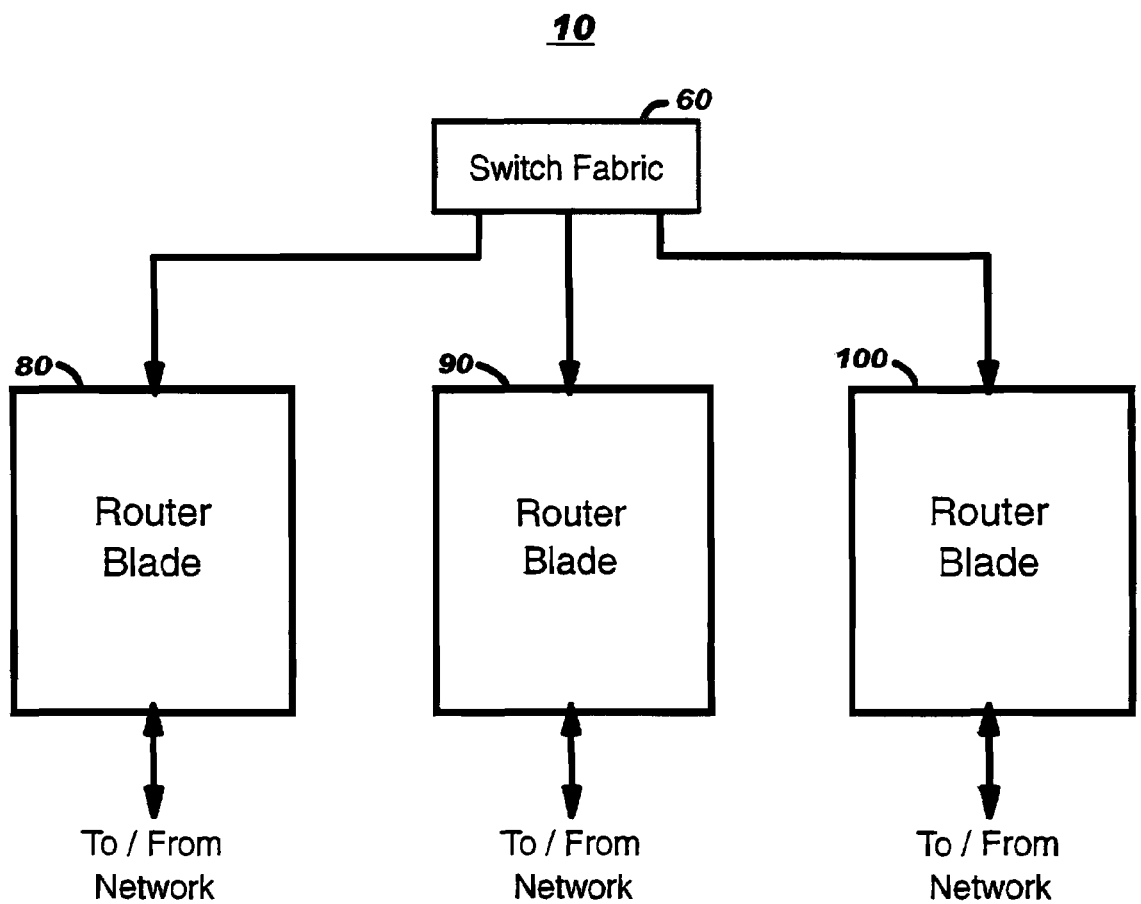
FIG. 2 is a depiction of a typical switch/router in the prior art.
Figure 3:
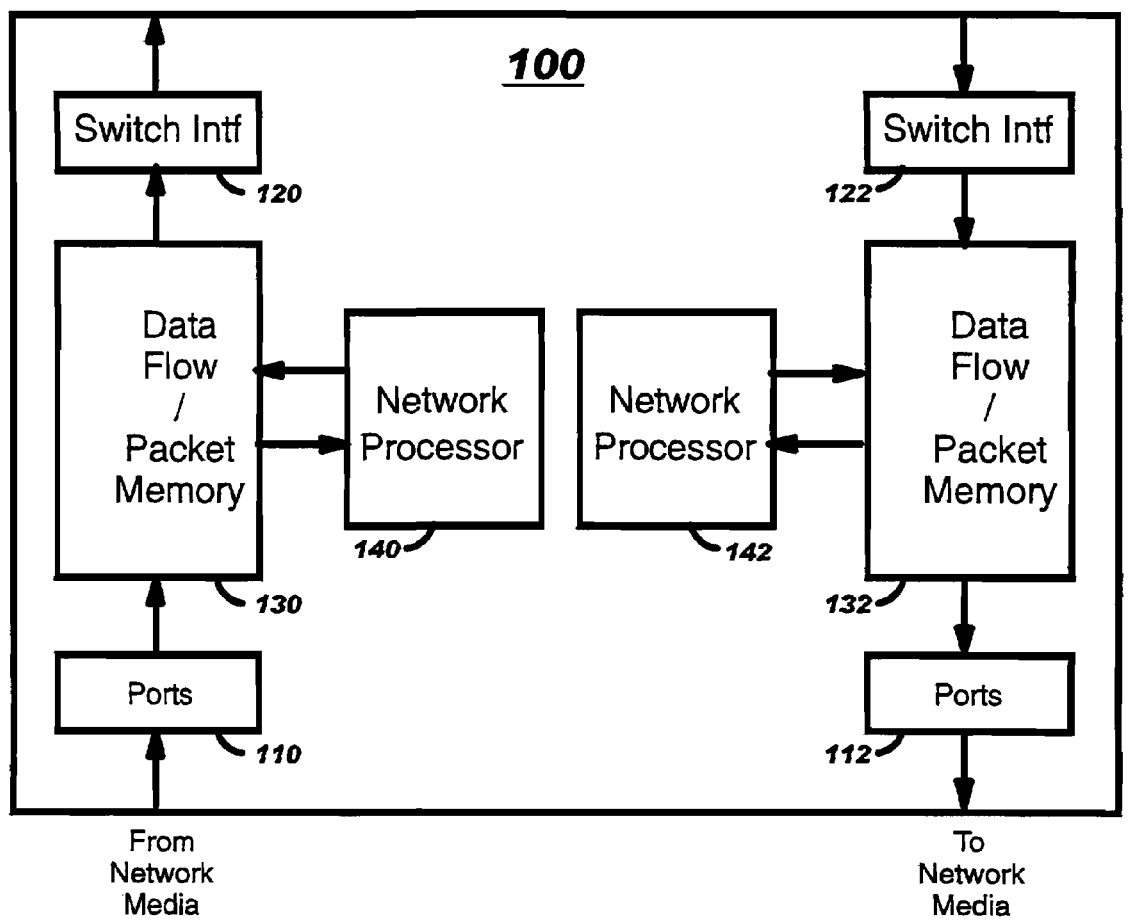
FIG. 3 is a more detailed depiction of a typical router blade in the prior art.

FIG. 4-A is a depiction of a typical router blade 150 in accordance with the present invention. For very high data throughput such as OC-192 (10 Gigabits per second Packet-over-Sonet), router blade 150 is likely implemented with multiple chips, with ingress data flow 160, egress data flow 162, network processor 180, and network processor 182 each implemented as individual chips. Input ports 152 connect network links into ingress data flow 160, and switch interface 156 connects ingress data flow 160 to a switch fabric (not shown). Likewise, switch interface 158 connects switch fabric (not shown) to egress data flow 162, and output ports 154 connect egress data flow 162 to network links. Within data flow 160, 162 Enqueue/Frame Alteration unit 164, 166 and Header Field Extraction Unit 170, 168 control the flow of data to and from network processors 180, 182, as will be described in more detail below. For blades with lower data throughput such as OC-48 (2.5 Gigabits per second Packet-over-Sonet) all of the functions for router blade 150 depicted in FIG. 4-A may be implemented in a single chip.

FIG. 4-B illustrates how a single-chip network processor designed for a lower data throughput can support a router blade 150 requiring up to four times the throughput of the network processor in accordance with the present invention. Note that FIG. 4-B depicts only the ingress portion of router blade 150. It should be understood that the egress portion is similar but with packet flows in the opposite direction (i.e. from switch interface to ports).

The IBM PowerNP is a single chip Network Processor (NP) targeted at full-duplex 4 Gbps Ethernet and POS OC-48 network environments requiring significant headroom for complex packet processing. In actuality, the PowerNP is equipped with a level of packet processing power adequate for OC-192 networking environments, including input ports 194, output ports 196, switch interface output 176, switch interface input 178, a plurality of processors 186, an ingress data flow unit 188 connected to ingress packet memory 190, and egress data flow unit 184 connected to egress packet memory 192. The only thing limiting throughput of the PowerNP 4GS4 to OC-48 speeds is the capacity to get the data into and out of the NP. The present invention describes a method and structure to address this limitation, thus enabling the PowerNP to become a legitimate OC-192 network processor.

Referring to FIG. 4-B, a PowerNP is used as ingress network processor 180 in an OC-192 router blade 150. A second PowerNP is used as egress network processor 182. To overcome the basic throughput limitations of the OC-48 connectivity, a separate dataflow device 160 is required to buffer packets and forward a dispatch message consisting of only protocol headers and a unique packet identifier to the NP for processing across link 178 to the NP switch interface input port. The NP 180 returns an enqueue message containing modified headers and/or frame alteration and routing directions to enqueue/frame alteration unit 164 within the dataflow 160 using the NP switch interface output port across link 176. Enqueue/frame alteration unit 164 reestablishes the association between the network packet stored in packet memory and the enqueue message via the unique packet identifier copied from the dispatch message to the enqueue message by the NP. Enqueue/frame alteration unit 164 then responds to the enqueue message to modify the network packet in accordance with frame alteration description within the enqueue message and to enqueue the network packet to the queue designated by the queue ID field of the enqueue message. For normal network traffic, this would suffice, since average packet rates for OC-192 are lower than maximum packet rates (minimum packet size) for OC-48. Unfortunately, most network equipment designers base technology decisions on the capability to handle media speed at minimum packet size. In this case, the headers represent the entire packet content, and present more data than an OC-48 device could handle. Using the switch interface to the NP helps, since there is typically more bandwidth on this interface than on the port interface. However, even the switch interface capacity is less than half the OC-192 line rate. The present invention overcomes this limitation by using header field extraction unit 168 within dataflow 160 to extract appropriate fields from the protocol headers to forward to the NP. Other fields from the protocol headers that are not required for packet processing are kept in packet buffers within or attached to the dataflow 160. The elimination of unnecessary protocol header fields from dispatch messages to NP 180 significantly reduce the amount of data that must be sent to NP 180 over link 178 for each packet it processes.

Figure 6:
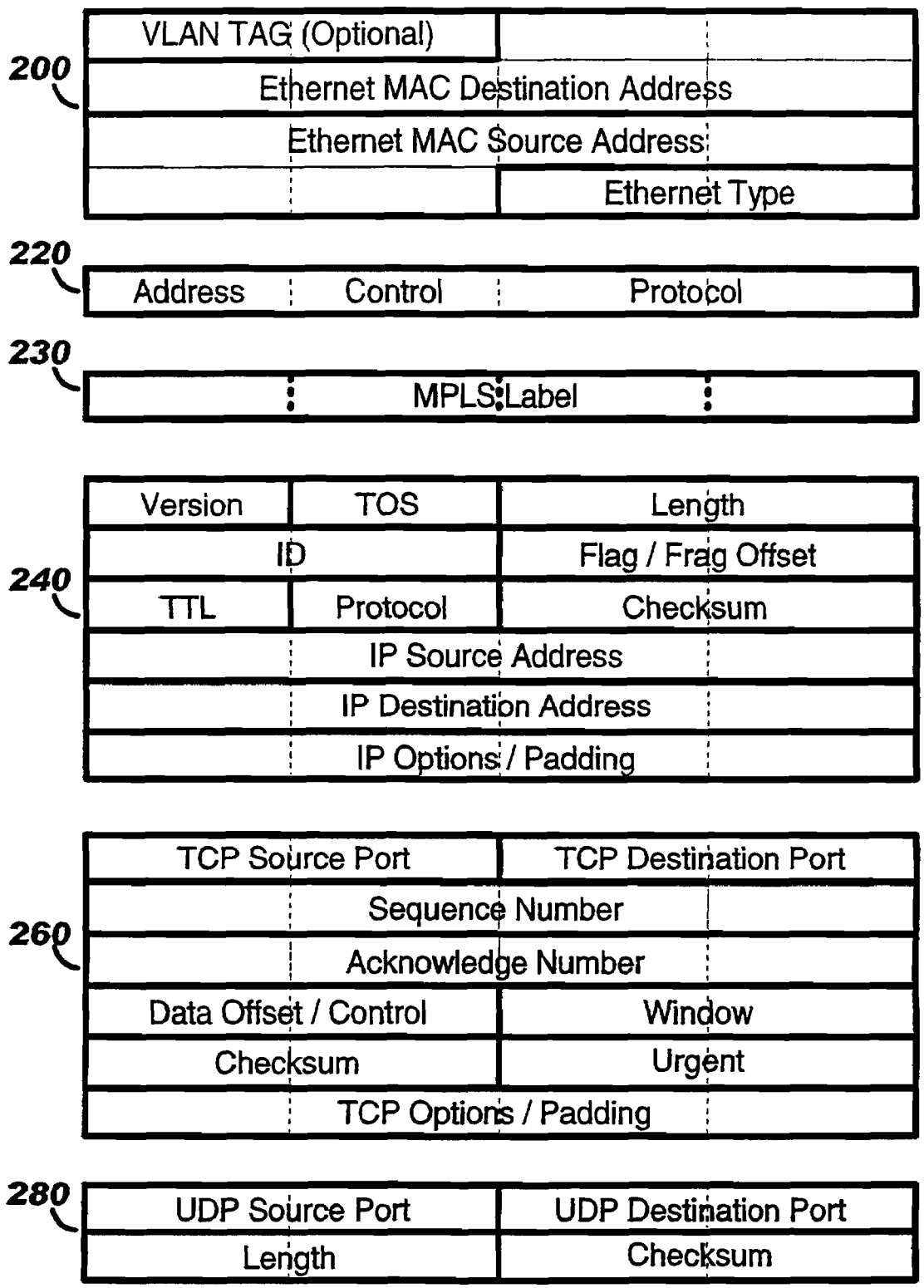
FIG. 6 is a depiction of parameter fields included in various protocol headers in the prior art.
Figure 7:
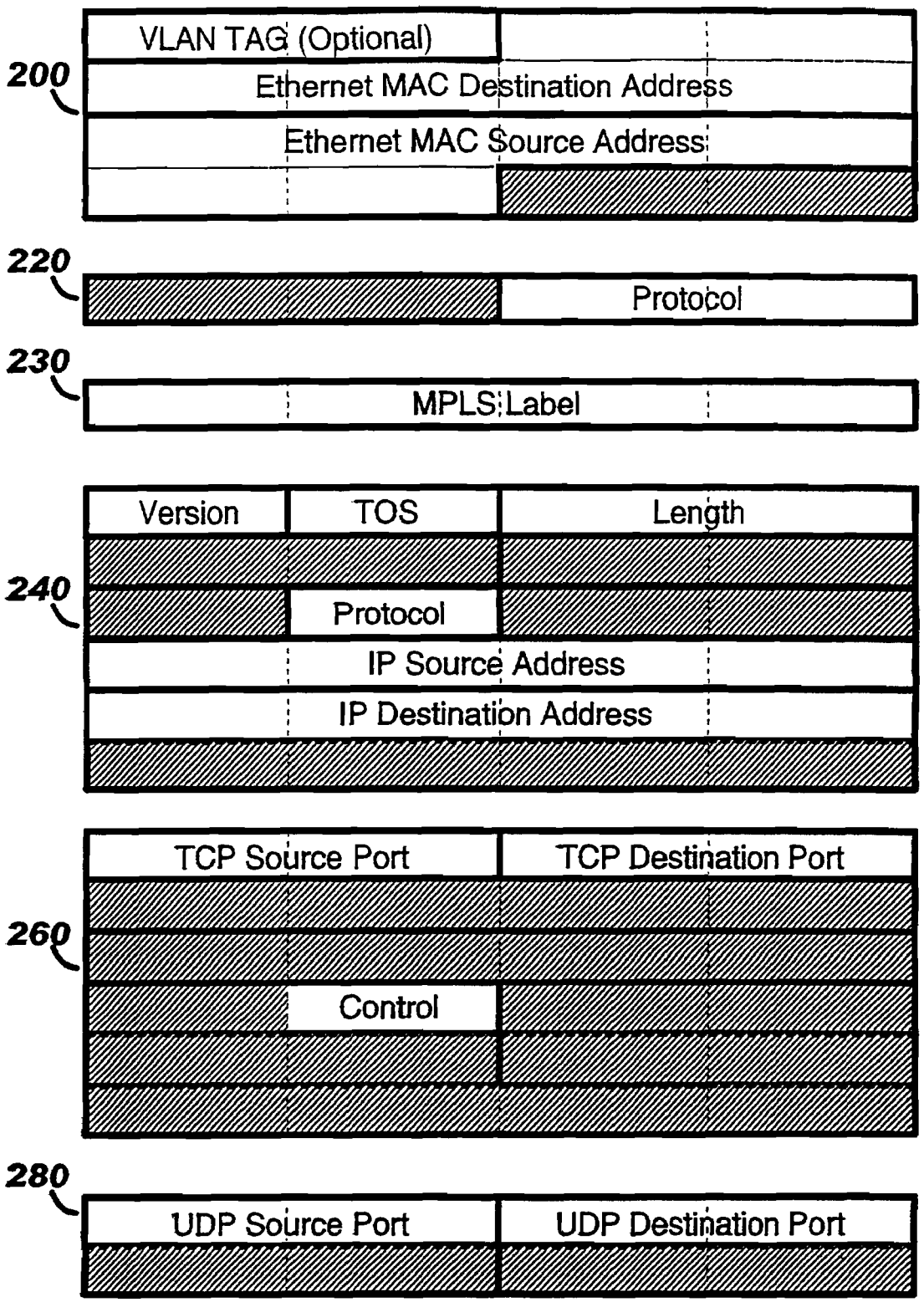
FIG. 7 is a depiction of the subset of parameter fields from the protocol headers depicted in FIG. 6 that are required by a network processor in accordance with the present invention.

FIG. 6 depicts various protocol headers as previously described. FIG. 7 is a depiction of the same protocol header formats including additional illustration of parameter fields from each protocol header to be included in header dispatch messages to NP 180 according to the preferred embodiment of the present invention. Parameter fields not included in header dispatch messages are cross-hatched. Selected parameter fields from Ethernet header 200 include the following fields:

| | |
|---|---|
| VLAN tag | 2 bytes |
| Ethernet MAC Destination Address | 6 bytes |
| Ethernet MAC Source Address | 6 bytes |

Selected parameter fields from PPP header 220 include the following fields:

| | |
|---|---|
| Protocol | 2 bytes |

Selected parameter fields from MPLS header 230 include the following fields:

| | |
|---|---|
| MPLS label | 4 bytes |

Selected parameter fields from IP header 240 include the following fields:

| | |
|---|---|
| Version/Header length | 1 byte |
| TOS | 1 byte |
| Length | 2 bytes |
| Protocol | 1 byte |
| Source Address | 4 bytes |
| Destination Address | 4 bytes |

Selected parameter fields from TCP header 260 include the following fields:

| | |
|---|---|
| Source Port | 2 bytes |
| Destination Port | 2 bytes |
| Control/Reserved | 1 byte |

Selected parameter fields from UDP header 280 include the following fields:

| | |
|---|---|
| Source Port | 2 bytes |
| Destination Port | 2 bytes |

Figure 5:
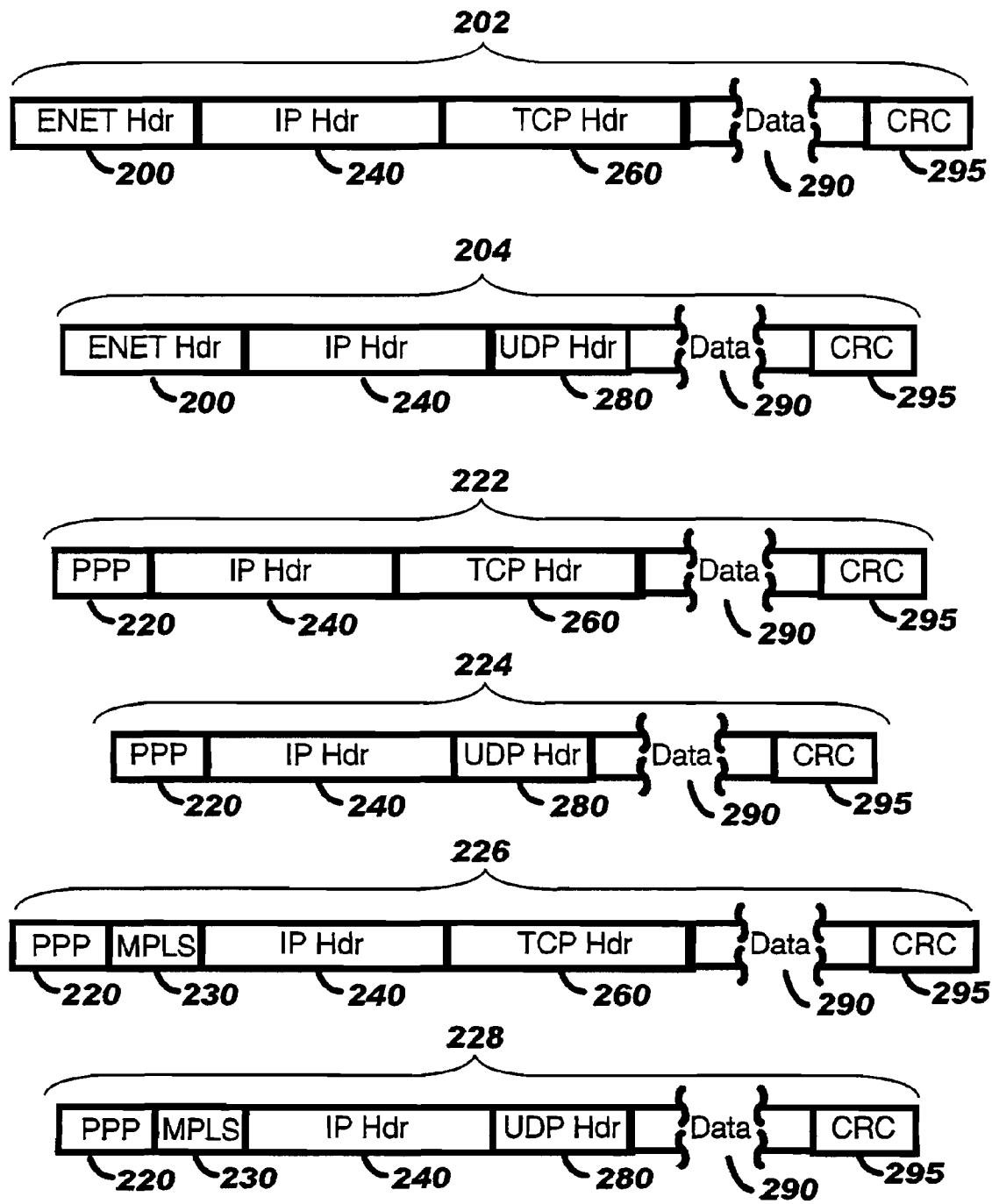
FIG. 5 is a depiction of various packet formats typical in networks in the prior art.

In accordance with the present invention, packet classifier state machine 172 within header field extraction unit 168 first classifies incoming packet formats such as those illustrated in FIG. 5 by interpreting in sequence specific fields from protocol headers illustrated in FIG. 6. The first protocol header within a network packet is typically determined according to the physical link type attached to input port 152 (FIG. 4A) and output port 154. For example Ethernet header 200 is associated with an Ethernet physical link, while PPP header 220 is associated with a Packet Over Sonet physical link. The packet classifier state machine 172 identifies a protocol or type field from one protocol header to identify the type of protocol header that follows. The packet classifier state machine 172 in this way is able to characterize a packet such as those illustrated in FIG. 5, by sequentially analyzing protocol header types. Once a packet type has been identified, header field extraction unit 168 then selects a dispatch message format appropriate for the protocol headers included within the detected packet format. Finally, header field extraction unit 168 selects appropriate fields from each protocol header of interest according to the illustration of FIG. 7, and concatenates these fields into a dispatch message. Looking more closely at FIG. 7, it can readily be realized that the packet format classification performed by the header field extraction unit 168 does not have to differentiate between TCP and UDP packets. One extra field will be extracted for TCP that is not required for UDP, but extending an UDP dispatch message by one byte results in identical formats. The NP 180 will recognize from the Protocol field of the IP header 240 that the extra byte can be ignored in the case of an UDP packet. It should be readily understood that additional packet formats, additional protocol headers, and alternate definitions of parameter fields to be extracted from protocol headers may be used without departing from the spirit and scope of the present invention. Note that selective header field extraction may limit some applications (e.g. protocol termination point), but should be reasonably applicable to a wide variety of networking functions.

Selective protocol header field extraction as described above is effective in reducing the data throughput to NP 180 to the point that OC-192 can be supported. However, the rate at which the NP 180 can accept new dispatch messages is also limited. The PowerNP was designed to accept dispatch messages based on the maximum possible packet rate on an OC-48 link, but the packet rate on OC-192 can be four times larger. The present invention overcomes this limitation by using composite dispatch messages, each consisting of extracted protocol header fields from multiple packets. Header field extraction unit 168 concatenates multiple dispatch messages into a single composite dispatch message to be sent to NP 180.

Figure 8:
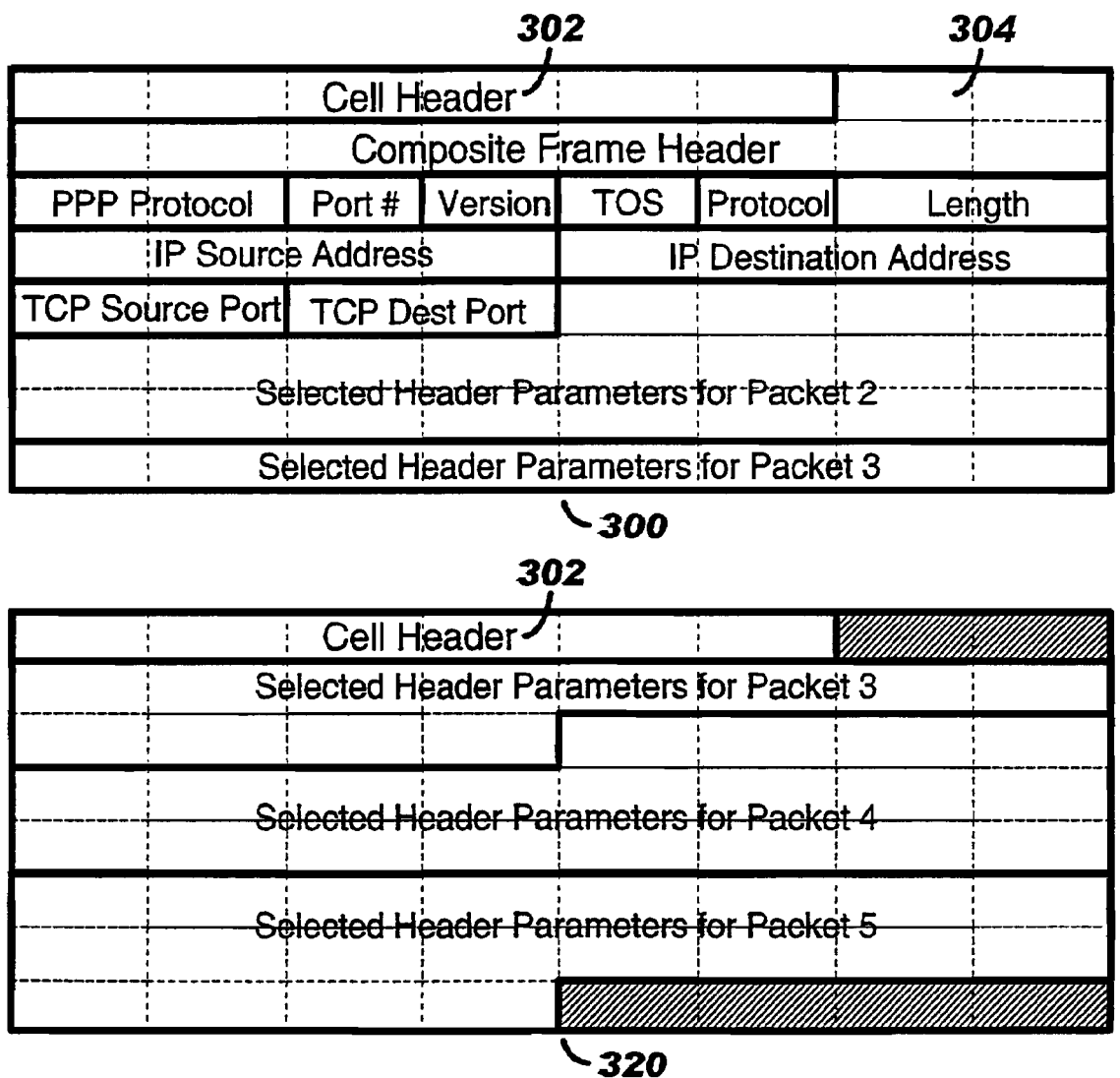
FIG. 8-A is a depiction of a dispatch message for PPP packets to an Ingress network processor in accordance with the present invention.

As mentioned previously, the switch interface of NP 180 is used to connect NP 180 with dataflow 160. One dataflow/NP set 160, 180 is required for ingress processing, and a second/NP set 162, 182 is required for egress processing, as illustrated in FIG. 4-A to support a fill-duplex OC-192 connection. Based on timings of the PowerNP, a convenient composite dispatch message size, illustrated in FIG. 8-A, includes two switch cells 300, 320 of 64 bytes each. After subtracting a 6 byte cell header 302 from each cell, and a 10 byte frame header 304, a payload of 106 bytes remains, corresponding to 21 bytes per packet if 5 packets are aggregated into each composite packet. Implementation may be preferably limited to 20 bytes per packet in order to maintain consistent operand alignment. Frame header 304 is used to transport a packet bundle identifier to be used to maintain an association with the bundle of packets stored in data flow 160. Note that the dispatch message/packet association does not require a separate packet identifier per packet as was described previously. FIG. 8-A also illustrates how the selected fields from a PPP header 220, IP header 240, and TCP header 280 from packet format 222 are concatenated into a 20 byte dispatch message, and combined with four additional dispatch messages with similar format.

Note that for a 10 Gbps Ethernet link, the larger minimum packet size enables the use of an alternate format of the composite packet, illustrated in FIG. 8-B, including switch cells 340, 360 that contain 3 packet dispatch messages with 32 bytes of header data per packet, resulting in additional payload capacity to transport additional data extracted from the Ethernet header 200. With a switch clock of 6 ns, these composite packets could be passed to the NP at a rate of 5.2 million per second, supporting a media packet rate of 26 million packets per second. The same data transfer capacity would be available to return an enqueue message to the dataflow 160 from the Ingress side of the NP, although return data per packet might be limited to a quadword (16 bytes) to make the writing of that data into the Ingress datastore 190 more efficient.

Figure 9:
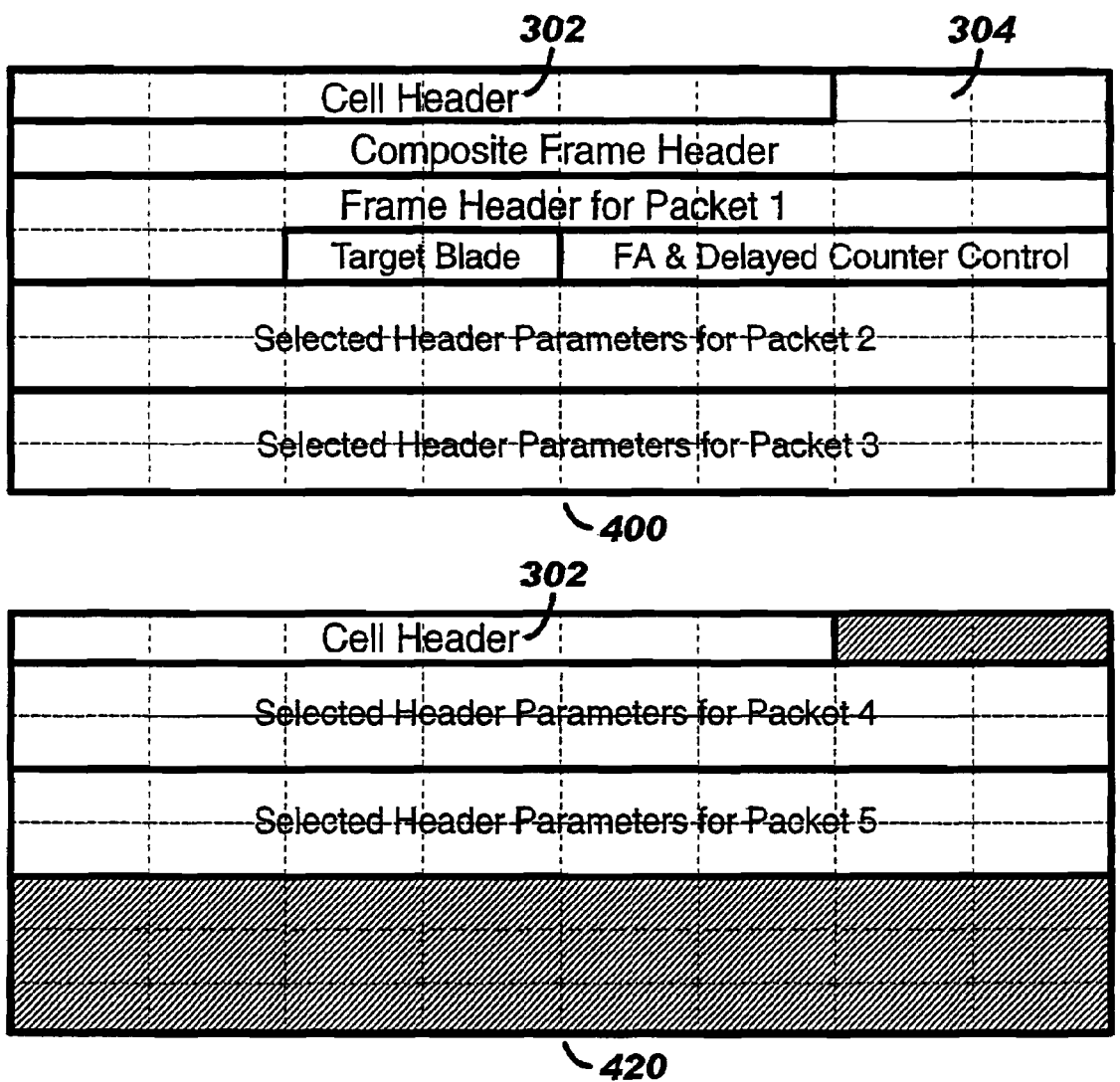
FIG. 9 is a depiction of an enqueue message for PPP packets from an Ingress network processor in accordance with the present invention.

FIG. 9 illustrates a preferred format of the Ingress enqueue message comprising of two switch cells 400, 420 for packets flowing toward switch interface 156. As with the dispatch message, the preferred format concatenates enqueue messages for five network packets into a single composite enqueue message. The enqueue message contains a frame header relating to each packet in order to pass intermediate processing data to the egress NP 182 and a target blade field to guide data flow 160 as to which target blade and priority queue the packet should be sent to. The frame header includes as an example the following parameters (additional/alternate parameters may be available based on format and usage):

Unicast/Multicast selection
Flow control information
Look-up identifier to assist egress processing in determining target port/flow
Frame header format
Source port number
Frame header extension (32 bit field generally useful to pass data to egress)

Delayed counter and limited frame alteration control is also part of the enqueue message. Packet demultiplex unit 174 within enqueue/frame alteration unit 164 must reestablish the association of the enqueue message with a set of network packets using a previously mentioned packet bundle identifier copied from the dispatch message to the corresponding enqueue message. Preferably, the packet bundle identifier is embedded within composite frame header 304 of both dispatch and enqueue messages, and provides a common identification for all network packets associated with the corresponding dispatch or enqueue message. As with the dispatch message, a composite enqueue message associated with Ethernet packets would preferably bundle fewer packets (e.g. 3) within the same message size resulting in more data available per packet.

Figure 10:
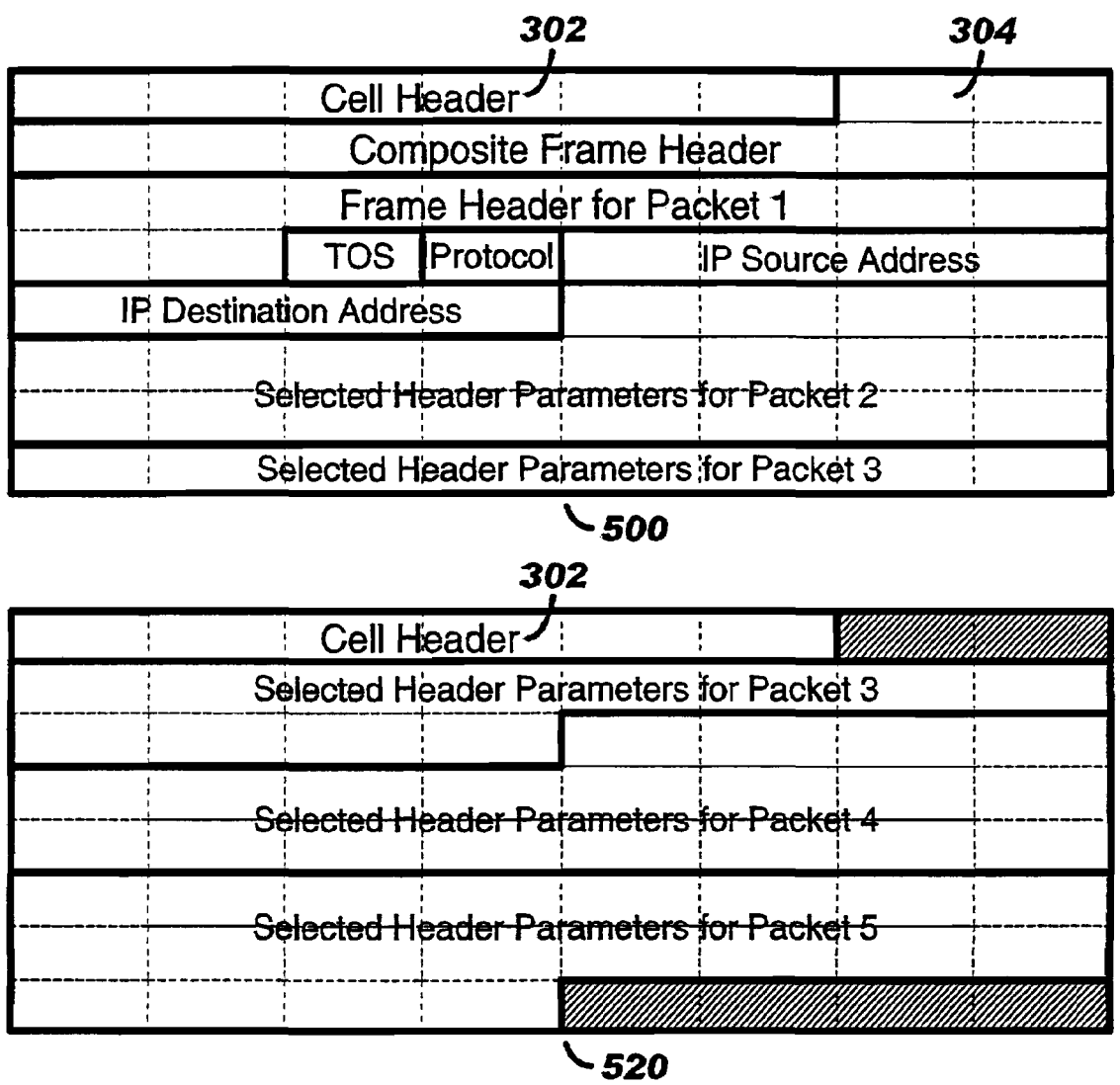
FIG. 10 is a depiction of a dispatch message for PPP packets to an Egress network processor in accordance with the present invention.

Dispatch messages from egress data flow 162 to egress NP 182, as illustrated in FIG. 10, are similar to those previously described for ingress, comprising of two switch cells 500, 520, but specific parameter fields are somewhat different. Individual packet frame headers are derived from ingress enqueue message content generated at the source blade of the switch/router, while other fields are extracted from the original packet content as with the ingress dispatch message. In fact, the packet frame header can be viewed as another protocol header added by ingress processing and extracted from the packet by header field extraction unit 168 within the egress data flow 162. In the case of the packet frame header, the entire header is extracted for use by egress NP 182. As with ingress messages, Ethernet formats preferably bundle fewer packets into each message.

FIG. 11-A illustrates the preferred format of the egress enqueue message, comprising of two switch cells 600, 620. As with the ingress enqueue message, frame alteration and delayed counter control are included. Frame alterations requirements are more extensive on the egress side, and thus require more data. Instead of the frame header and target blade, the egress enqueue message includes a queue ID (QID) designating the target flow or port for the packet. FIG. 11-B illustrates an alternate format for the egress enqueue message for Ethernet configurations, consisting of two switch cells 640, 660. Note that as with the ingress dispatch message, only three packets are packed into a single composite message, resulting in more data to control the more extensive frame alterations required by Ethernet packets.

An alternative message format (not illustrated) applicable to all of the previously described message types consists of 3 switch cells per composite dispatch or enqueue message, with a corresponding payload of 164 bytes, or 20 bytes per packet when aggregating 8 packet headers. For Ethernet messages, this format supports 5 packets with 32 bytes of data per packet. Switch bandwidth supports 3.5 million composite header packets per second with this configuration, supporting a media packet rate of 27.8 million packets per second. This represents a reasonable tradeoff between the number of bytes available per packet, queuing latency, and the number of packets per second that can be processed. An additional benefit of this configuration is the amortization of buffer management operations over more packets.

Figure 12:
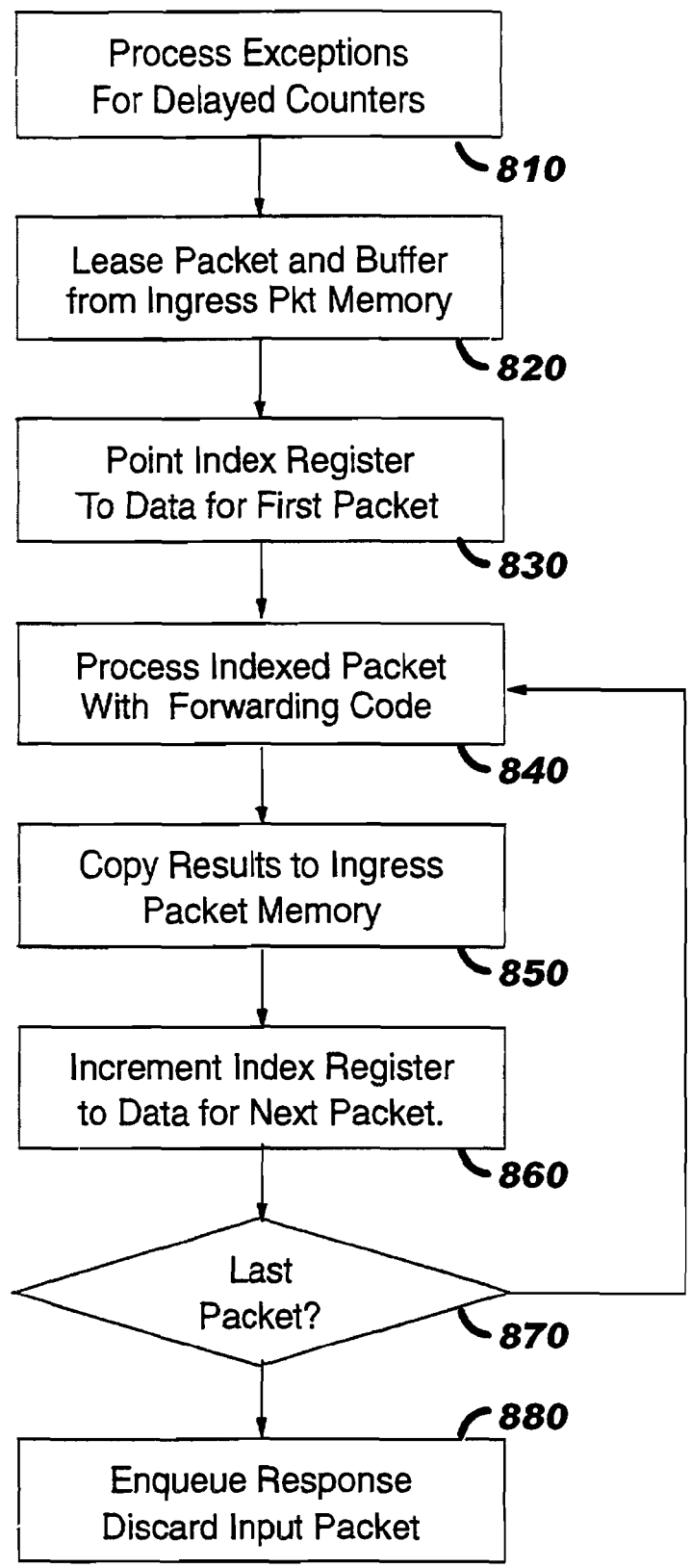
FIG. 12 is a flowchart of required processing by a network processor in accordance with the present invention.

Forwarding software running in embedded processor complex 186 must be modified to support composite dispatch and enqueue messages. FIG. 12 depicts a flowchart of forwarding software in accordance with the present invention. The dispatch message is stored in egress packet memory 192 after receiving it from data flow 160 through link 178, and the first 64 bytes of the message (e.g. data from the first switch cell 300) is also sent to a selected processor within embedded processor complex 186. Data from subsequent switch cells 320 may also be transferred immediately to embedded processor complex 186 or may be accessed one cell at a time by additional explicit processing steps not shown in FIG. 12. Processing is initiated at step 810 with the receipt of a dispatch message at the selected processor within complex 186.

At step 810, delayed counter operations are handled with scaffolding code that increments the appropriate counter based on corrections requested by the data flow 160. Each packet is processed based on the assumption that it will be forwarded by data flow 160 unless forwarding code explicitly makes a decision to discard a packet. Counts of forwarded packets and/or bytes are incremented by that forwarding code. Within the data flow 160, discard actions could result in an incorrect count for both forwarded packets/bytes and discarded packets/bytes. In order to compensate for this, data flow 160 will return an incorrectly executed counter definition to the NP 180 within a subsequent composite frame header 304. For each returned counter definition, the scaffolding code then decrements the previously altered forwarded counter and increments the corresponding discard counter. This mechanism is robust as long as sustained discard rates are under 20%. Note that the frame header for the composite dispatch message is available for this function since each packet within the bundle creates its own frame header for communications with Egress.

Forwarding software continues execution at step 820 at which time scaffolding code allocates a new packet and data buffer within ingress packet memory 190. This memory allocation request involves removing a frame control block (FCB) from the FCB free queue, removing a buffer control block (BCB) from the BCB free queue, and modifying the FCB to point to the BCB. This new packet is allocated for returning an enqueue message such as that depicted in FIG. 9 to data flow 160. Memory allocation is requested in advance of when it is actually required since a significant time delay might be encountered in receiving a response from the memory allocation request. Additional processing can continue while waiting for this response in order to minimize the performance effects of the memory allocation latency.

Once the memory allocation request has been issued at step 820, an index register is initialized to point to the compressed dispatch data for the first packet in the composite dispatch message bundle at step 830, and standard forwarding software is initiated at step 840. The forwarding software must be recompiled or reassembled with data structures defined according to composite dispatch and enqueue message formats such as those depicted in FIGS. 8-11. Once the standard forwarding software has run to completion in step 840, scaffolding code copies the results from processing the packet into ingress packet memory at step 850 according to the desired format of the composite enqueue message such as is illustrated in FIG. 9 or FIG. 11.

At step 860, the index register initialized at step 830 is incremented to point to the dispatch message data for the next packet. At step 870, a determination is made as to whether or not the last packet has been processed. If the last packet has not been processed, control is passed to step 840 where forwarding code is executed for the next packet in the bundle. Steps 840 through 870 are repeated for each subsequent packet in the bundle, after which a determination is made at step 870 that the last packet has indeed been processed. Processing then terminates at step 880 at which point the composite enqueue message is returned from ingress packet memory 190 to enqueue/frame alteration unit 164 within data flow 160, and the original composite dispatch message is discarded by returning the associated buffers in egress packet memory 192 to the buffer free queue. Although details of the packet forwarding code executed at step 840 vary significantly between ingress and egress, as well as from one packet to the next (even within the same bundle of packets aggregated within a single composite dispatch message), the processing steps depicted in FIG. 12 are substantially the same for each case.

Packet aggregation also enables a method of performance optimization at the expense of code complexity. Typically, forwarding code progresses through a significant sequence of instructions leading up to a tree search, and may overlap some code execution after start of the search, but typically waits for an extended number of cycles for completion of the search. Multithreading covers some but not all of the remaining cycles with execution on an alternate thread. With multiple packets to process, code for one packet could be executed in the shadow of the search for the previous packet in the bundle. Assuming an adequate number of general-purpose registers in the processor, one could approach the performance of a processor with double the number of threads at the expense of code complexity. This performance optimization would not be necessary for basic routing functions, but might be useful for more complex applications.

While the invention has been particularly shown and described relative to a preferred embodiment thereof, it will be understood by those skilled in the art that numerous changes to the forgoing description are possible relative to form, features, options, and other details without departing from the spirit and scope of the invention as set forth in the following claims.

We claim:

1. A method for conveying data using switch cells, comprising: providing a computer infrastructure to generate a compressed dispatch message comprising at least two switch cells from a plurality of data packets by: classifying a data packet format by sequentially analyzing protocol headers of a plurality of data packets; selecting a dispatch method format appropriate for the classified data packet format; extracting a subset plurality of fields from the analyzed data packet protocol headers from a subset plurality of the plurality of data packets appropriate to the classified format, the subset plurality of fields having a quantity of fields less than a total quantity of fields of the appropriate subset plurality of data packets; generating a first switch cell of the at least two switch cells of the compressed dispatch message comprising a first cell header field, a composite frame header field and a first payload field by concatenating at least two of the extracted subset fields to the first payload field; and generating a second switch cell of the at least two switch cells of the compressed dispatch message comprising a second cell header field and a second payload field by concatenating at least two remaining cells of the extracted subset fields to the second payload field; and wherein the compressed dispatch message is dispatched.

2. The method of claim 1 wherein the compressed dispatch message comprises three cells, further comprising: generating a third switch cell of the at least two switch cells of the compressed dispatch message comprising a third cell header and a third payload by concatenating each remaining cell of the extracted subset fields to the third payload.

3. The method of claim 1, the computer infrastructure further generates the compressed dispatch message by: classifying the data packet format by determining a port physical link type attached to an input port or an output port in a first protocol header; and extracting the subset plurality of fields by identifying protocol header fields relevant to the determined port physical link type.

4. The method of claim 3, the first cell composite frame header further relating to each of the appropriate subset plurality of data packets to pass intermediate processing data to a network processor; and the first cell further comprising a target blade field comprising target blade identification and queue packet priority data.

5. The method of claim 4, the computer infrastructure further generates the composite frame header by embedding a packet bundle identifier within the composite frame header, the packet bundle identifier providing a common identification for each of the appropriate subset plurality of data packets associated with the compressed dispatch message.

6. The method of claim 1 wherein the compressed dispatch message is an ingress enqueue message, the computer infrastructure further generates the ingress enqueue message composite frame header with: a unicast/multicast selection parameter; a flow control information parameter; a look-up identifier parameter comprising egress processing target port/flow data; a frame header format parameter; a source port number parameter; and a frame header extension parameter.

7. The method of claim 1 wherein the compressed dispatch message is an egress data flow dispatch message generated by deriving individual packet frame headers from ingress enqueue message content generated at a source blade of a switch.

8. The method of claim 1 wherein the compressed dispatch message is an egress enqueue message comprising a queue ID field designating a target flow.

9. A method for conveying data using switch cells, comprising: an embedded processor complex storing executable program code; the program code comprising instructions which, when executed on a computer system, cause the computer system to generate a compressed dispatch message comprising at least two switch cells from a plurality of data packets by: classifying a data packet format by sequentially analyzing protocol headers of a plurality of data packets; selecting a dispatch method format appropriate for the classified data packet format; extracting a subset plurality of fields from the analyzed data packet protocol headers from a subset plurality of the plurality of data packets appropriate to the classified format, the subset plurality of fields having a quantity of fields less than a total quantity of fields of the appropriate subset plurality of data packets; generating a first switch cell of the at least two switch cells of the compressed dispatch message comprising a first cell header field, a composite frame header field and a first payload field by concatenating at least two of the extracted subset fields to the first payload field; and generating a second switch cell of the at least two switch cells of the compressed dispatch message comprising a second cell header field and a second payload field by concatenating at least two remaining cells of the extracted subset fields to the second payload field.

10. The method of claim 9, the program code comprising instructions which, when executed on the computer system, further cause the computer system to generate a compressed dispatch message comprising three cells by generating a third switch cell of the at least two switch cells the compressed dispatch message comprising a third cell header and a third payload field by concatenating each remaining cell of the extracted subset fields to the third payload field.

11. The method of claim 9, the program code comprising instructions which, when executed on the computer system, further cause the computer system to generate the compressed dispatch message by: classifying the data packet format by determining a port physical link type attached to an input port or an output port in a first protocol header; and extracting the subset plurality of fields by identifying protocol header fields relevant to the determined port physical link type.

12. The method of claim 11, the program code comprising instructions which, when executed on the computer system, further cause the computer system to relate the first cell composite frame header to each of the appropriate subset plurality of data packets, the composite frame header further passes intermediate processing data to a network processor; and to cause the computer system to define a target blade field in the first cell comprising target blade identification and queue packet priority data.

13. The method of claim 12, the program code comprising instructions which, when executed on the computer system, further cause the computer system to generate the composite frame header by embedding a packet bundle identifier within the composite frame header, the packet bundle identifier providing a common identification for each of the appropriate subset plurality of data packets associated with the compressed dispatch message.

14. The method of claim 9, the program code comprising instructions which, when executed on the computer system, further cause the computer system to generate an ingress enqueue compressed dispatch message, the ingress enqueue message composite frame header comprising: a unicast/multicast selection parameter; a flow control information parameter; a look-up identifier parameter comprising egress processing target port/flow data; a frame header format parameter; a source port number parameter; and a frame header extension parameter.

15. The method of claim 9, the program code comprising instructions which, when executed on the computer system, further cause the computer system to generate an egress data flow compressed dispatch message by deriving individual packet frame headers from ingress enqueue message content generated at a source blade of a switch.

16. The method of claim 9, the program code comprising instructions which, when executed on the computer system, further cause the computer system to generate an egress enqueue compressed dispatch message comprising a queue ID field designating a target flow.

17. A dataflow device, comprising: an enqueue/frame alteration component; and a header field extraction component; wherein the dataflow device is connected to a port to connect to a network link, and to a network processor through a switch interface, the switch interface connects to a switch fabric; and wherein the header field extraction component generates a compressed dispatch message comprising at least two switch cells from a plurality of data packets by: classifying a data packet format by sequentially analyzing protocol headers of a plurality of data packets; selecting a dispatch method format appropriate for the classified data packet format; extracting a subset plurality of fields from the analyzed data packet protocol headers from a subset plurality of the plurality of data packets appropriate to the classified format, the subset plurality of fields having a quantity of fields less than a total quantity of fields of the appropriate subset plurality of data packets; generating a first switch cell of the at least two switch cells of the compressed dispatch message comprising a first cell header field, a composite frame header field and a first payload field by concatenating at least two of the extracted subset fields to the first payload field; and generating a second switch cell of the at least two switch cells of the compressed dispatch message comprising a second cell header field mad a second payload field by concatenating at least two remaining cells of the extracted subset fields to the second payload field.

18. The data flow device of claim 17, wherein the header field extraction component further comprises a packet classifier state machine to classify the data packet format by determining a port physical link type attached to an input port or an output port in a first protocol header; and wherein the header field extraction component extracts the subset plurality of fields by identifying protocol header fields relevant to the determined link type.

19. The data flow device of claim 18, wherein the header field extraction component concatenates the compressed dispatch message subset plurality into the composite dispatch message by: generating a composite frame header relating to each of the plurality of data packets associated with the compressed dispatch message, the composite frame header further passes intermediate processing data to a network processor; and a target blade field comprising target blade identification and queue packet priority data.

20. The data flow device of claim 19, wherein the header field extraction component generates the composite frame header by embedding a packet bundle identifier within the composite frame header, the packet bundle identifier providing a common identification for the plurality of data packets associated with the compressed dispatch message; and wherein the enqueue frame alteration unit further comprises a packet demultiplex unit to route the plurality of data packets associated with the compressed dispatch message by using the packet bundle identifier to reestablish association with each of the associated plurality of data packets.

* * * * *